United States Patent Office 3,306,922
Patented Feb. 28, 1967

3,306,922
MOLECULAR SIEVE ADSORBENTS
Richard M. Barrer, Bromley, Kent, and Patrick J. Denny, Caversham, Reading, England, and Edith M. Flanigen, Buffalo, N.Y., assignors to Union Carbide Corporation, a corporation of New York
No Drawing. Filed Mar. 22, 1961, Ser. No. 97,474
20 Claims. (Cl. 260—448)

This invention relates to synthetic adsorbent materials and more particularly to synthetic crystalline forms of nitrogenous aluminosilicate zeolites, derivatives thereof and methods of making these adsorbent materials.

The term "zeolite," in general refers to a group of rigid, three-dimensional crystalline, hydrated metal aluminosilicates; some of these occur in nature and some have been synthesized. The synthetic zeolite materials of this invention exhibit significant differences in properties over naturally occurring zeolites and other synthetic zeolites. For convenience and distinguishability, the synthetic materials of this invention will be referred to hereinafter as zeolite N-A, zeolite N-X, zeolite N-Y and zeolite N-B wherein the term "N" designates an ammonium or alkyl ammonium substituted cationic species, such as tetramethylammonium ion and lower derivatives thereof, and the letters A, X, Y and B designate various types of zeolitic structures containing the tetramethylammonium cation or derivative thereof.

open three-dimensional framework of $SiO_4$ and $AlO_4$ tetrahedra. The tetrahedra are cross-linked by the sharing of oxygen atoms, so that the ratio of oxygen atoms to the total of the aluminum and silicon atoms is equal to two, or $O/(Al+Si)=2$. The negative electrovalence of tetrahedra containing aluminum is conventionally balanced by the inclusion of alkali metal or alkaline earth metal ions within the crystal in the ratio of 2 Al/(2Na, 2 K, 2 Li, Ca, Ba, Sr, etc.)=1. Moreover it has been found in the zeolite art that in some compositions one metal cation may be replaced for another by suitable exchange techniques. Consequently, crystalline zeolites are often employed as ion-exchange agents.

It is also known that the crystal structures of zeolites possess interstices of molecular dimensions. The interstitial spaces are generally occupied by water molecules. Under proper conditions, viz., after at least partial dehydration, these zeolites may be utilized as efficient adsorbents whereby adsorbate molecules are retained within the interstitial spaces. Access to these channels is had by way of pores in the crystal lattice. These openings limit the size and shape of the molecules that can be adsorbed. A separation of mixtures of different species of molecules based upon molecular dimensions, wherein certain molecules are adsorbed by the activated zeolite while others are refused, is therefore possible. It is this characteristic property of many crystalline zeolites that has led to their designation as "molecular sieves." In addition to molecular size and shape, however, other factors may also influence the selective adsorption of certain molecules by molecular sieves. Among these factors are: the polarizability and polarity of the adsorbate molecules; the degree of unsaturation of organic adsorbates; the size and polarizing power of the interstitial cation; the presence of adsorbate molecules in the interstitial spaces; and the degree of hydration of the zeolite.

A number of synthetic crystalline zeolites have been prepared. They are distinguishable from each other, and from naturally occurring materials, on the basis of their composition, crystal structure, adsorbing ability, and other properties. A suitable method for distinguishing these compounds, for example, is by their X-ray powder diffraction patterns and the ratio of silica to alumina within the crystal structure. The existence of a number of zeolites having similar but distinguishable properties advantageously permits the selection of a particular member having optimum properties for a particular use.

The present invention has as its prime object the provision of novel, synthetic, crystalline zeolites of the molecular sieve type. Another object is to provide novel, synthetic, crystalline zeolites having useful ion-exchange and adsorption properties. A further object is to provide a convenient and efficient process for preparing the novel materials of this invention. Additional objects and advantages will be apparent from the ensuing disclosure and appended claims.

Heretofore the electrovalent balance within the framework of silica and alumina tetrahedra during synthesis was thought to be only attainable by having present in the reactant mixture a substantial quantity of metal cations, such as sodium. Once the metal cation ion had been included in the reactant mixture and the synthesis reaction completed, the metal ions which occupy the cationic sites of the crystal could then be replaced by a wide variety of other metallic cations using ion exchange techniques. For the first time in the synthetic zeolite art we have prepared crystalline zeolites containing a substantial weight percent of a cation other than sodium or other metal cation. The incorporation of cations other than metal cations directly into the crystal structure in high concentrations during synthesis has not heretofore been accomplished. Substitution could in some cases be accomplished by ion-exchange methods applied to the crystalline product.

In the novel process of the present invention, nitrogenous aluminosilicate zeolites of the molecular sieve type are produced. An embodiment of the process of the present invention comprises heating a suitable aqueous reactant mixture containing tetramethylammonium hydroxide $(CH_3)_4NOH$, for the preparation of zeolites N-A, N-X, and N-Y, and containing ammonium, tetramethylammonium, or lower derivatives of tetramethylammonium hydroxide, such as $NH_3(CH_3)OH$, $$NH_2(CH_3)_2OH$$

and $NH(CH_3)_3OH$, for the preparation of zeolite N-B, and proper mixtures of the oxides $Al_2O_3$ and $SiO_2$, between about 25–150° C. for zeolites N-A, N-X and N-Y, and between about 200–300° C. for zeolite N-B. Other soluble alkyl-substituted or partially substituted derivatives of ammonium hydroxide such as tetraethylammonium hydroxide may be used to supply the nitrogenous cationic species to the reactant mixture. For zeolites such as N-X and N-Y, their more open structure permits the incorporation, during synthesis, of larger alkyl-substituted derivatives of ammonium hydroxide such as tetrapropylammonium hydroxide and tetrabutylammonium hydroxide. This mixture is placed in a closed container usually made of metal or glass. The synthesis reaction is thus conducted under autogenous pressure. For best results, the crystallization procedure for the preparation of nitrogenous zeolites N-A, N-X and N-Y is carried out at a temperature of approximately 100° C., the pressure being atmospheric or at least that corresponding to the vapor pressure of water in equilibrium with the mixture of reactants at a higher temperature. Any suitable heating apparatus, e.g., an oven, sand bath, oil bath or jacketed autoclave, may be used. Heating is continued until the desired crystalline zeolite product is formed. The zeolite crystals are then filtered off and washed to separate them from the reactant mother liquor. The zeolite crystals should be washed, preferably with distilled water, until the effluent wash water, in equilibrium with the product, has a pH of between about 9 and 11. Other zeolite types may be produced according to the teachings of this invention.

In the preparation of zeolites N–A, N–X and N–Y, crystallization temperatures below 25° C. require extremely long crystallization times. Above about 150° C. other crystalline aluminosilicates are formed in substantial quantities in addition to or instead of the desired N–A, N–X, or N–Y.

In the production of nitrogenous aluminosilicate zeolites according to the present invention, the reactants are combined as aqueous mixtures having in the aggregate an overall composition, conveniently expressed in terms of oxide mole ratios, defined in the general case as follows:

$$R_2O/Al_2O_3 = a$$
$$SiO_2/Al_2O_3 = b$$
$$H_2O/Al_2O_3 = c$$

where R is ammonium, alkyl-substituted or partially substituted derivatives of ammonium, and where the values of $a$, $b$, and $c$ are defined as the essential determinants for the production of the desired type of zeolite. The composition of the initial reactant mixture is critical.

In the production of tetramethylammonium zeolite N–A, reactant mixtures may be employed having a composition, expressed in terms of oxide mole ratios, within the following range:

$$R_2O/Al_2O_3 = 1.5-3.5$$
$$SiO_2/Al_2O_3 = >4-10$$
$$H_2O/Al_2O_3 = 170-460$$

where R is tetramethylammonium ion. Zeolite N–A has also been crystallized from reactant mixtures having molar ratios of $R_2O/Al_2O_3$ of as high as 14. A preferred range of initial reactant compositions is as follows:

$$R_2O/Al_2O_3 = 3-3.5$$
$$SiO_2/Al_2O_3 = \text{about } 10$$
$$H_2O/Al_2O_3 = \text{about } 200$$

In the production of tetramethylammonium zeolite N–X, reactant mixture may be employed having a composition, expressed in terms of oxide mole ratios, within the following range:

$$R_2O/Al_2O_3 = 1.5-4.2$$
$$SiO_2/Al_2O_3 = 2-3$$
$$H_2O/Al_2O_3 = 120-330$$

where R is tetramethylammonium ion. Zeolite N–X has also been crystallized from reactant mixtures having a molar ratio of $R_2O/Al_2O_3$ of as high as 6.3. A preferred range of initial reactant compositions is as follows:

$$R_2O/Al_2O_3 = \text{about } 4$$
$$SiO_2/Al_2O_3 = \text{about } 3$$
$$H_2O/Al_2O_3 = \text{about } 200$$

In the production of tetramethylammonium zeolite N–Y, reactant mixtures may be employed having a composition, expressed in terms of oxide mole ratios within the following range:

$$R_2O/Al_2O_3 = 1.5-2.5$$
$$SiO_2/Al_2O_3 = >3 \text{ to } <4$$
$$H_2O/Al_2O_3 = 120-330$$

where R is tetramethylammonium ion. A preferred range of initial reactant compositions is as follows:

$$R_2O/Al_2O_3 = \text{about } 2.5$$
$$SiO_2/Al_2O_3 = \text{about } 3.5$$
$$H_2O/Al_2O_3 = \text{about } 300$$

In the production of alkyl ammonium zeolite N–B, reactant mixtures may be employed having a composition, expressed in terms of oxide mole ratios, with the following ranges:

|  | Range 1 | Range 2 |
| --- | --- | --- |
| $R_2O/Al_2O_3$ equals | About 1.5 | About 1.5. |
| $SiO_2/Al_2O_3$ equals | About 6 | 2–6. |
| $H_2O/Al_2O_3$ equals | 120–460 | 120–460. | where R is trimethylammonium ion for range 1, and R is dimethylammonium ion for range 2. In the preferred process for production of zeolite N–B, R is dimethylammonium ion.

We have found that small quantities of alkali metal cations in the reactant mixture are beneficial for the production of nitrogenous zeolites by the process of this invention, but that it is not necessary to have a high percentage of the alkali metal cations present in the initial reactant mixture. The presence of small quantities of alkali metal cations greatly reduces the time necessary to form crystalline zeolites by this invention. This was substantiated by (1) preparing zeolite N–A in a soft glass reaction vessel, using a colloidal silica sol having 29.0 to 30.0 wt.-percent silica as a silica source which contained up to several tenths of a wt.-percent $Na_2O$ (2) preparing zeolite N–A in a stainless steel reaction vessel, using the same silica source as in (1); and (3) using a stainless steel reaction vessel but using an ammonium-stabilized silica source which contained less than 0.01 wt.-percent $Na_2O$. The results were as follows:

TABLE I

| Run No. | Temp., °C. | Digestion Time, Days | Reaction Vessel | Weight Percent $Na_2O$ in Silica Source | Percent N–A |
| --- | --- | --- | --- | --- | --- |
| 1 | 100 | 3 | Soft Glass [1] | 0.5–1.0 | 100 |
| 2 | 100 | 6 | Stainless Steel | 0.5–1.0 | 50 |
| 3 | 100 | 77 | do | <0.01 | 0 |

[1] An additional comparable amount of $Na_2O$ was provided by the soft glass reaction vessel.

Thus, it is shown that small quantities of sodium greatly reduce the time within which crystallization will occur.

The reactant mixture of Run 3 eventually produced crystalline zeolite N–A material. Within the temperature range of about 100–150° C., crystallization times of from about 3 to 8 days are suitable.

The compositions of nitrogenous crystalline zeolites may be stoichiometrically expressed in terms of moles of oxides, as: $1.0 \pm 0.1 R_{2/n}O:Al_2O_3:zSiO_2:yH_2O$ wherein R represents an ammonium or alkylammonium cation; $n$ represents the valence of R; $z$ is the moles of silica; and $y$ is the moles of water and usually has a value from 0 to about 7.

When sodium or other alkali metal ion is present in the reactant mixtures used to prepare nitrogenous zeolites by this invention, the composition of nitrogenous crystalline zeolites may be expressed in terms of moles of oxides as:

$$1.0 \pm 0.1[(1-x)R_2O + xM_2O]:Al_2O_3:zSiO_2:yH_2O$$

wherein R represents an ammonium or alkylammonium cation, M represents alkali metal cation, preferably sodium, $x$ represents the alkali metal cation fraction within the crystal and has a value less than 1, $z$ is the moles of silica and $y$ is the moles of water and usually has a value from 0 to about 7.

The composition of tetramethylammonium zeolite N–A, may be represented as follows:

$$1.0 \pm 0.1 R_2O : Al_2O_3 : 4.25 \pm 1.75 SiO_2 : 0\text{-}7H_2O$$

wherein R represents the tetramethylammonium cation; when alkali metal cation is present, the composition may be expressed as:

$$1.0 \pm 0.1[(1-x)R_2O + xM_2O] : Al_2O_3 :$$
$$4.25 \pm 1.75 SiO_2 : 0\text{-}7H_2O$$

wherein R represents the tetramethylammonium cation, M represents alkali metal cation, preferably sodium, $x$ represents the alkali metal cation fraction of M within the crystal structure and may vary from 0 to about 0.9. Usually $x$ varies from 0 to about 0.5.

The general formula for the product composition of tetramethylammonium zeolite, N–X, may be represented as follows:

$$1.0 \pm 0.1[(1-x)R_2O + xM_2O] : Al_2O_3 :$$
$$2.5 \pm 0.5 SiO_2 : 0\text{-}7H_2O$$

wherein R represents the tetramethylammonium cation and M and $x$ are as defined above.

The general formula for the product composition of tetramethylammonium zeolite N–Y, may be represented as follows:

$$1.0 \pm 0.1[(1-x)R_2O + xM_2O] : Al_2O_3 : zSiO_2 : 0\text{-}7H_2O$$

wherein R represents the tetramethylammonium cation, $z$ represents the moles of $SiO_2$ and has values greater than 3 to about 6, M and $x$ are as defined above.

The general formula for the product composition of nitrogenous zeolite N–B, may be represented as follows:

$$1.0 \pm 0.2[(1-x)R'_2O + xM_2O] : Al_2O_3 :$$
$$3.5 \pm 1.5 SiO_2 : 0\text{-}7H_2O$$

wherein R' represents ammonium, tetramethylammonium or lower derivatives of tetramethylammonium, such as mono-, di-, and tri-methylammonium and M and $x$ are as defined above.

The maximum value of $x$ for the nitrogenous zeolites is determined by the limitation that, by definition, the minimum number of alkylammonium cations per unit cell, which is the smallest entity of repeated order in the crystal structure, is one. Using this limitation and the unit cell composition and cation density of the specific nitrogenous zeolite structure, the maximum value of $x$ can be calculated. This calculation for type N–A zeolite is given below.

enous zeolites of this invention. A number of the tables are directed to the general X-ray pattern of a particular zeolite, namely, Tables A, B, D and F. The remaining tables identify products of specific examples.

In obtaining the X-ray powder diffraction patterns, standard techniques were employed. The radiation was the K-alpha doublet of copper; a Geiger counter spectrometer with recorder was used for the patterns of Tables A, B, C, D and E. The peak heights, I, were read from the spectrometer chart. From these, the relative intensities, $100 \times I/I_{max.}$, where $I_{max.}$ is the intensity of the strongest line or peak, and $d$(A.), the interplanar spacing in Angstroms, were determined.

In Table F and in Example 1, the diffraction pattern was recorded with an X-ray film camera. Inherently the film technique has somewhat less accuracy in the measurement of both $d$-spacings and intensities than the Geiger counter spectrometer method. The particular X-ray technique and/or apparatus employed, the humidity, the temperature, the orientation of the powder crystals and their size and other variables, all of which are well known and understood to those skilled in the art of X-ray crystallography or diffraction, can cause some minor variations in intensities and positions of the lines.

Although zeolite N–A described herein shows some structural similarities to the as-synthesized or sodium form of type A ($Na_2A$) zeolite identified in U.S. Patent 2,882,243, issued April 14, 1959, to R. M. Milton, zeolite N–A may among other ways be distinguished from $Na_2A$ and from other zeolites and silicates by differences in its X-ray powder diffraction pattern, chemical composition, ion-exchange properties and adsorption properties. The X-ray powder diffraction pattern of zeolite N–A is given in Table A. Significant differences between the $d$-spacings, relative intensities and unit cell size of zeolites N–A and $Na_2A$ are apparent from a comparison of Table A herein, with Table A in U.S. Patent 2,882,243, e.g., for N–A the cubic cell constant $a_0$ is 12.12 A., and for $Na_2A$, $a_0$ is 12.32 A.

It is of further importance to note the marked differences in the molar silica-to-alumina ratios of $Na_2A$ zeolite and of the N–A zeolite of this invention. The silica-to-alumina ratio of $Na_2A$ zeolite varies from about 1.35 to about 2.35, and is usually synthesized with a ratio of about 2. The silica-to-alumina ratio of the crystalline N–A zeolite material of this invention is between about 2.5 to 6.0. Thus, for the first time there has been produced a highly siliceous crystalline zeolite exhibiting some structural similarities to type A zeolite. The silica-rich structure of zeolite N–A results in a significant increase

| I | II | III | IV | V | VI | |
|---|---|---|---|---|---|---|
| Nitrogenous Zeolite | Anhydrous Stoichiometric Composition in Oxide Ratios | Anhydrous Unit Cell Composition [1] | Total No. of Cations, Unit Cell | No. of Alkyl Ammonium Cations, Unit Cell | No. of Alkali Metal Cations, Unit Cell | Maximum value of $x$, Column VI Column IV |
| N–A | $Me_2O \cdot Al_2O_3 \cdot 2.5SiO_2$ | $[Me]_{11}[AlO_2]_{11}[SiO_2]_{13}$ | 11 | 1 | 10 | 0.91 |
|  | $Me_2O \cdot Al_2O_3 \cdot 6.0SiO_2$ | $[Me]_6[AlO_2]_6[SiO_2]_{18}$ | 6 | 1 | 5 | 0.83 |

[1] Where Me refers to a monovalent cation.

It can be seen from the above data that the maximum value of $x$ for any one nitrogenous zeolite species is obtained at the minimum mole ratio of $SiO_2/Al_2O_3$ corresponding to the maximum cation density. Maximum values of $x$ obtained for several other nitrogenous zeolite species by this method are shown below:

Nitrogenous zeolite: Maximum value of $x$
N–X _____ 0.99
N–Y _____ 0.99
N–B _____ 0.8

Tables A through F appearing herein set forth the X-ray powder diffraction patterns of the various nitrogin structural stability over that of the less siliceous zeolite $Na_2A$.

In addition to the differences in molar $SiO_2/Al_2O_3$ ratios hereinabove described, zeolite N–A may be distinguished from $Na_2A$ on the basis of cation composition, as shown by the general formula for the product composition of tetramethylammonium zeolite N–A given hereinabove. It is important to note that a tetramethylammonium form of zeolite $Na_2A$ cannot be prepared by any known ion-exchange method, since the radius of the tetramethylammonium ion is too large to enter the pores in the structure of $Na_2A$. This is demonstrated by the following example, wherein $Na_2A$ was treated by the customary ion-exchange technique employing treatment of the zeolite with an aqueous solution of a water-soluble salt of the exchanging ion. Sodium zeolite A was successively treated with portions of one liter of 1N tetramethylammonium bromide solution, washed with distilled water until free of bromide ion, and analyzed for nitrogen content. The product was found to contain less than 0.1 wt.-percent N, showing that essentially no exchange of the tetramethylammonium ion had taken place.

The size of the $(CH_3)_4N^+$ cation is greater than the size of the pores in the N–A zeolite structure; hence, once this cation has been incorporated in the N–A zeolite structure by the synthesis method of the invention, it cannot be removed from this structure by the conventional ion-exchange techniques. For example, using the ion-exchange procedure described hereinabove, treatment with calcium chloride and sodium chloride solutions did not produce any exchange of the calcium or sodium with the incorporated $(CH_3)_4N^+$ ion in the N–A structure. If however $Na^+$ and $(CH_3)_4N^+$ ions are present in the reactant mixture and are subsequently incorporated in the synthesized N–A crystals, the $Na^+$ ions present in the N–A crystal structure may be subsequently ion-exchanged with other metal cations, notably those of K, Li, Ca, Ba, Sr, etc. For example, tetramethylammonium N–A zeolite containing 4.4 wt.-percent $Na_2O$ was prepared. This N–A zeolite was then ion-exchanged with a calcium chloride solution; the analysis of the product showed that all of the sodium ion originally present in the N–A zeolite had been exchanged with calcium but the tetramethylammonium content of the N–A zeolite structure remained unchanged. Thus, it is possible to prepare a zeolite structure having both exchangeable and non-exchangeable cations and having a predetermined quantity of exchangeable cation sites.

Having a zeolite with a predetermined quantity of exchangeable cations permits one to introduce a controlled quantity of a particular cation into a desired process stream.

The following examples are representative of the processes for producing the zeolites of the present invention:

EXAMPLE 1

*Preparation of zeolite N–A*

A solution of tetramethylammonium aluminate was prepared by dissolving 10.0 g. of freshly precipitated $Al(OH)_3$ in a solution containing 29.0 g. of $$(CH_3)_4NOH \cdot 5H_2O$$

in 180 g. of water. The solution was then added to 63.8 g. of an aqueous colloidal silica sol containing 29.5 percent silica by weight. The resultant reaction mixture, having a composition, expressed in terms of moles of oxides, as follows:

$$1.5[(CH_3)_4N]_2O \cdot Al_2O_3 \cdot 6.0SiO_2 \cdot 200H_2O$$

was stirred until homogeneous. Crystallization of the desired zeolite product was carried out by heating the reaction mixture in a sealed stainless steel container at a temperature of 100° C. for about 8 days. The crystalline product which formed was separated from the reactant mother liquor by filtration, washed with water until the effluent wash water had a pH of about 9 to 11 and dried. X-ray analysis of the product revealed the powder diffraction pattern shown below, wherein the lettered intensity designations are as follows: VS=very strong, S=strong, MS=medium strong, M=medium, MW=medium weak, W=weak. This pattern identifies the product as zeolite N–A.

| $d$, A.: | Relative intensity |
|---|---|
| 12.1 ±0.03 | S |
| 8.60 ±0.03 | S |
| 7.02 ±0.02 | S |
| 6.08 ±0.01 | VW |
| 5.44 ±0.01 | W |
| 4.97 ±0.01 | W |
| 4.30 ±0.01 | MW |
| 4.05 ±0.01 | VS |
| 3.833±0.004 | MW |
| 3.659±0.004 | VS |
| 3.365±0.004 | MS |
| 3.243±0.004 | S |
| 2.941±0.004 | S |
| 2.856±0.004 | M |
| 2.712±0.004 | MW |
| 2.646±0.004 | MW |
| 2.585±0.004 | MS |
| 2.479±0.004 | W |
| 2.429±0.004 | W |
| 2.215±0.004 | MW |
| 2.144±0.004 | M |
| 2.024±0.004 | M |

$a_0 = 12.13$ A.

EXAMPLE 2

*Preparation of zeolite N–A*

A solution of tetramethylammonium aluminate was prepared by dissolving 1.6 g. of freshly precipitated $Al(OH)_3$ in a solution containing 12.5 g. of $$(CH_3)_4NOH \cdot 5H_2O$$

in 14.8 g. of water. The solution was then added to 20.0 g. of an aqueous colloidal silica sol containing 29.5 percent silica by weight. The resultant reaction mixture, having a composition, expressed in terms of moles of oxides, as follows:

$$3.5[(CH_3)_4N]_2O \cdot Al_2O_3 \cdot 10.0SiO_2 \cdot 202H_2O$$

was stirred until homogeneous. Crystallization of the desired zeolite product was carried out by heating the reaction mixture in a sealed soft glass jar at a temperature of 100° C. for about 2.9 days. The crystalline product which formed was separated from the reactant mother liquor by filtration, washed with water until the effluent wash water had a pH of about 9 to 11 and dried. X-ray analysis of the product revealed a powder diffraction pattern characteristic of zeolite N–A as shown in Table A, with a cubic unit cell constant, $a_0$, of 12.12 A. Chemical analysis showed the zeolite product to have a composition, expressed in terms of moles of oxides, corresponding to the formula $$0.66[(CH_3)_{3.5}N]_2O : 0.39Na_2O : Al_2O_3 : 5.82SiO_2 : 6.8H_2O$$

As discussed previously, the $Na_2O$ in the product was derived from the colloidal silica sol used as a reactant and from the soft glass reaction vessel.

EXAMPLE 3

*Preparation of zeolite N–A*

A solution of tetramethylammonium aluminate was prepared by dissolving 16.9 g. of freshly precipitated $Al(OH)_3$ in a solution containing 108.0 g. of $$(CH_3)_4NOH \cdot 5H_2O$$

in 157 g. of water. The solution was then added to 200 g. of an aqueous colloidal silica sol containing 29.5 percent silica by weight. The resultant reaction mixture, having a composition, expressed in terms of moles of oxides, as follows:

$$3.0[(CH_3)_4N]_2O \cdot Al_2O_3 \cdot 10.0SiO_2 \cdot 198H_2O$$

was stirred until homogeneous. Crystallization of the desired zeolite product was carried out by heating the reaction mixture in a sealed soft glass jar at a temperature of 100° C. for about 5 days. The crystalline product which formed was separated from the reactant mother liquor by filtration, washed with water until the effluent wash water had a pH of about 9 to 11 and dried.

X-ray analysis of the product revealed a powder diffraction pattern characteristic of zeolite N–A as shown in Table A (X-ray data for N–A). Chemical analysis showed the zeolite product to have a composition, expressed in terms of moles of oxides, corresponding to the formula:

0.50[(CH$_3$)$_{3.2}$N]$_2$O:0.40Na$_2$O:Al$_2$O$_3$:4.40SiO$_2$:4.9H$_2$O again, the Na$_2$O in the product was derived from the colloidal silica sol used as a reactant and from the soft glass reaction vessel.

TABLE A.—X-RAY POWDER DIFFRACTION DATA FOR TETRAMETHYLAMMONIUM ZEOLITE N-A

| h k l | d, A. | I/I$_{max}$ ×100 |
|---|---|---|
| 100 | 12.08±0.02 | 100 |
| 110 | 8.55±0.02 | 60 |
| 111 | 6.99±0.01 | 45 |
| 200 | 6.06±0.01 | 5 |
| 210 | 5.42±0.01 | 8 |
| 211 | 4.95±0.01 | 6 |
| 220 | 4.29±0.01 | 11 |
| 221, 300 | 4.039±0.004 | 59 |
| 310 | 3.834±0.004 | 7 |
| 311 | 3.655±0.003 | 68 |
| 320 | 3.360±0.003 | 24 |
| 321 | 3.238±0.002 | 36 |
| 322, 410 | 2.939±0.002 | 36 |
| 330, 411 | 2.856±0.002 | 11 |
| 420 | 2.710±0.002 | 5 |
| 421 | 2.644±0.002 | 5 |
| 332 | 2.583±0.002 | 15 |
| 422 | 2.474±0.002 | 5 |
| 430, 500 | 2.423±0.002 | 3 |
| 431, 510 | 2.375±0.002 | 1 |
| 511, 333 | 2.333±0.002 | 2 |
| 520, 432 | 2.250±0.002 | 1 |
| 521 | 2.211±0.002 | 4 |
| 440 | 2.141±0.002 | 6 |
| 441, 522 | 2.111±0.001 | 1 |
| 530, 433 | 2.078±0.001 | 2 |
| 531 | 2.049±0.001 | 1 |
| 442, 600 | 2.019±0.001 | 8 |
| 610 | 1.992±0.001 | 1 |
| 611, 532 | 1.966±0.001 | 1 |
| 621, 540, 443 | 1.892±0.001 | 5 |
| 541 | 1.870±0.001 | 5 |
| 622 | 1.827±0.001 | 1 |
| 630, 542 | 1.808±0.001 | 1 |
| 700, 632 | 1.731±0.001 | 1 |
| 710, 550, 543 | 1.714±0.001 | 9 |
| 711, 551 | 1.696±0.001 | 1 |
| 720, 641 | 1.665±0.001 | 6 |
| 721, 633, 552 | 1.649±0.001 | 1 |
| 722, 544 | 1.605±0.001 | 4 |
| 731, 553 | 1.578±0.001 | 7 |
| 650, 643 | 1.551±0.001 | 4 |

$a_0$=12.12±0.02 A.

line product which formed was separated from the reactant mother liquor by filtration, washed with water until the effluent wash water had a pH of about 9 to 11 and dried. X-ray analysis of the product revealed a powder diffraction pattern characteristic of zeolite N–X as shown in Table B, wherein the lettered intensity designations are as previously defined.

TABLE B.—X RAY POWDER DIFFRACTION DATA FOR TETRAMETHYLAMMONIUM ZEOLITE N-X

| h k l | d, A. | Relative Intensity |
|---|---|---|
| 111 | 14.47–14.37 | VS |
| 220 | 8.85– 8.80 | M |
| 311 | 7.54– 7.50 | M |
| 331 | 5.73– 5.71 | S |
| 333, 511 | 4.81– 4.79 | M |
| 440 | 4.41– 4.46 | M |
| 531 | 4.22– 4.29 | W |
| 620 | 3.95– 3.93 | W |
| 533 | 3.80– 3.79 | S |
| 631 | 3.68– 3.66 | M |
| 642 | 3.34– 3.33 | S |
| 733 | 3.05– 3.04 | M |
| 822, 660 | 2.94– 2.93 | M |
| 751, 555 | 2.89– 2.87 | S |
| 840 | 2.79– 2.78 | M |
| 911, 753 | 2.74– 2.73 | W |
| 664 | 2.66– 2.65 | M |
| 844 | 2.55– 2.54 | VW |
| 10, 0, 0; 860 | 2.50– 2.49 | VW |
| 10, 2, 0; 862 | 2.45– 2.44 | VW |
| 10, 2, 2; 666 | 2.40– 2.39 | M |
| 10, 4, 0; 864 | 2.32– 2.29 | VW |
| 880 | 2.21– 2.20 | W |
| 11, 3, 1; 971; 955 | 2.19– 2.18 | VW |
| 11, 3, 3; 973 | 2.12– 2.11 | W |
| 12, 0, 0; 884 | 2.08– 2.07 | VW |
| 11, 5, 1; 777 | 2.05– 2.05 | VW |
| 10, 8, 2 | 1.93– 1.92 | VW |
| 13, 1, 1; 11, 7, 1; 11, 5, 5; 993 | 1.92– 1.91 | VW |
| 13, 3, 1; 11, 7; 3; 977 | 1.87– 1.86 | VW |
| 13, 3, 3; 995 | 1.83– 1.82 | VW |
| 888 | 1.81– 1.80 | VW |
| 13, 5, 1; 11, 7, 5 | 1.79– 1.78 | VW |
| 14, 2, 0; 10, 10, 0; 10, 8, 6 | 1.77– 1.76 | W |
| 13, 5, 4; 11, 8, 5 | 1.72– 1.71 | W |

EXAMPLE 4

*Preparation of zeolite N–X*

A solution of tetramethylammonium aluminate was prepared by dissolving 2.33 g. of freshly precipitated Al(OH)$_3$ in a solution containing 6.75 g. of (CH$_3$)$_4$NOH·5H$_2$O in 30.5 g. of water. The solution was then added to 5.0 g. of an aqueous colloidal silica sol containing 29.5 percent silica by weight. The resultant reaction mixture, having a composition, expressed in terms of moles of oxides as follows:

1.5[(CH$_3$)$_4$N]$_2$O·Al$_2$O$_3$·2.0SiO$_2$·190H$_2$O was stirred until homogeneous. Crystallization of the desired zeolite product was carried out by heating the reaction mixture in a sealed stainless steel container at a temperature of 100° C. for about 8 days. The crystal-

EXAMPLE 5

*Preparation of zeolite N–X*

A solution of tetramethylammonium aluminate was prepared by dissolving 1.3 g. of freshly precipitated Al(OH)$_3$ in a solution containing 12.7 g. of (CH$_3$)$_4$NOH·5H$_2$O in 20.5 g. of water. The solution was then added to 5.0 g. of an aqueous colloidal silica sol containing 29.5 percent silica by weight. The resultant reaction mixture, having a composition, expressed in terms of moles of oxides, as follows:

4.2[(CH$_3$)$_4$N]$_2$O·Al$_2$O$_3$·3.0SiO$_2$·210H$_2$O was stirred until homogeneous. Crystallization of the desired zeolite product was carried out by heating the reaction mixture in a sealed soft glass jar at a temperature of 100° C. for about 4.5 days. The crystalline product which formed was separated from the reactant mother liquor by filtration, washed with water until the effluent wash water has a pH of about 9 to 11 and dried. X-ray analysis of the product revealed the powder diffraction pattern shown in Table C with a cubic unit cell constant, $a_0$, of 24.92 A. This pattern is characteristic of zeolite N–X as shown in Table B.

TABLE C.—X-RAY POWDER DIFFRACTION DATA FOR TETRAMETHYLAMMONIUM ZEOLITE N–X

| h k l | d, A. | $I/I_{max} \times 100$ |
|---|---|---|
| 111 | 14.42 ±.02 | 100 |
| 220 | 8.80 ±.02 | 25 |
| 311 | 7.51 ±.02 | 20 |
| 331 | 5.72 ±.01 | 19 |
| 333, 511 | 4.80 ±.01 | 13 |
| 440 | 4.41 ±.01 | 8 |
| 531 | 4.22 ±.01 | 7 |
| 620 | 3.941±.004 | 11 |
| 533 | 3.800±.003 | 32 |
| 631 | 3.679±.003 | 30 |
| 612 | 3.331±.003 | 31 |
| 733 | 3.045±.002 | 9 |
| 822, 660 | 2.937±.002 | 12 |
| 751, 555 | 2.877±.002 | 31 |
| 840 | 2.784±.002 | 12 |
| 911, 753 | 2.731±.002 | 6 |
| 664 | 2.658±.002 | 14 |
| 844 | 2.543±.002 | 3 |
| 10, 0, 0; 860 | 2.492±.002 | 4 |
| 10, 2, 0; 862 | 2.442±.002 | 1 |
| 10, 2, 2; 666 | 2.398±.002 | 8 |
| 10, 4, 0; 864 | 2.315±.002 | 1 |
| 880 | 2.202±.001 | 4 |
| 11, 3, 1; 971; 955 | 2.176±.001 | 3 |
| 11, 3, 3; 973 | 2.115±.001 | 2 |
| 12, 0, 0; 884 | 2.076±.001 | 1 |
| 11, 5, 1; 777 | 2.056±.001 | 2 |
| 10, 8, 2 | 1.922±.001 | 2 |
| 13, 1, 1; 11, 7, 1; 11, 5, 5; 993 | 1.906±.001 | 3 |
| 13, 3, 1; 11, 7, 3; 977 | 1.863±.001 | 1 |
| 13, 3, 3; 995 | 1.822±.001 | 1 |
| 888 | 1.799±.001 | 1 |
| 13, 5, 1; 11, 7, 5 | 1.784±.001 | 1 |
| 14, 2, 0; 10, 10, 0; 10, 8, 6 | 1.762±.001 | 3 |
| 13, 5, 4; 11, 8, 5 | 1.713±.001 | 4 |

Cubic, $a_0 = 24.92$ A.

zeolite N–Y as shown in Table D wherein the lettered intensity designations are as previously defined.

TABLE D.—X-RAY POWDER DIFFRACTION DATA FOR FOR TETRAMETHYLAMMONIUM ZEOLITE N–Y

| h k l | d, A. | Relative Intensity |
|---|---|---|
| 111 | 14.37–14.15 | VS |
| 220 | 8.80– 8.67 | M |
| 311 | 7.50– 7.39 | M |
| 331 | 5.71– 5.62 | S |
| 333, 511 | 4.79– 4.72 | M |
| 440 | 4.46– 4.33 | M |
| 531 | 4.29– 4.16 | W |
| 600, 442 | 4.13– 4.09 | W |
| 620 | 3.93– 3.88 | W |
| 533 | 3.79– 3.74 | S |
| 631 | 3.66– 3.62 | M |
| 711, 551 | 3.48– 3.43 | VW |
| 642 | 3.33– 3.28 | S |
| 733 | 3.04– 3.00 | M |
| 822, 660 | 2.93– 2.89 | M |
| 751, 555 | 2.87– 2.83 | S |
| 840 | 2.78– 2.74 | M |
| 911, 753 | 2.73– 2.69 | W |
| 664 | 2.65– 2.61 | M |
| 844 | 2.54– 2.50 | VW |
| 10, 0, 0; 860 | 2.49– 2.45 | VW |
| 10, 2, 0; 862 | 2.44– 2.40 | VW |
| 10, 2, 2; 666 | 2.39– 2.36 | M |
| 10, 4, 0; 864 | 2.29– 2.25 | VW |
| 11, 1, 1; 775 | 2.24– 2.21 | VW |
| 880 | 2.20– 2.17 | W |
| 11, 3, 1; 971; 955 | 2.18– 2.14 | VW |
| 11, 3, 3; 973 | 2.11– 2.08 | W |
| 12, 0, 0; 884 | 2.07– 2.04 | VW |
| 11, 5, 2; 10, 7, 1; 10, 5, 5 | 2.03– 2.00 | VW |
| 10, 8, 2 | 1.92– 1.89 | VW |
| 13, 1, 1; 11, 7, 1; 11, 5, 5; 993 | | |
| 13, 3, 1; 11, 7, 3; 977 | 1.86– 1.83 | VW |
| 13, 3, 3; 995 | 1.82– 1.79 | VW |
| 888 | | |
| 13, 5, 1; 11, 7, 5 | 1.78– 1.76 | VW |
| 14, 2, 0; 10, 10, 0; 10, 8, 6 | 1.76– 1.73 | W |
| 13, 5, 4; 11, 8, 5 | 1.71– 1.69 | W |

EXAMPLE 6

*Preparation of zeolite N–Y*

A solution of tetramethylammonium aluminate was prepared by dissolving 1.15 g. of freshly precipitated Al(OH)$_3$ in a solution containing 6.75 g. of $$(CH_3)_4NOH \cdot 5H_2O$$

in 30.5 g. of water. The solution was then added to 5.0 g. of an aqueous colloidal silica sol containing 29.5 percent silica by weight. The resultant reaction mixture, having a composition, expressed in terms of moles of oxides, as follows:

$$2.5[(CH_3)_4N]_2O \cdot Al_2O_3 \cdot 3.4SiO_2 \cdot 314H_2O$$

was stirred until homogeneous. Crystallization of the desired zeolite product was carried out by heating the reaction mixture in a sealed soft glass jar at a temperature of 100° C. for about 8 days. The crystalline product which formed was separated from the reactant mother liquor by filtration, washed with water until the effluent wash water had a pH of about 9 to 11 and dried. X-ray analysis of the product revealed the powder diffraciton pattern shown in Table E, with a cubic unit cell constant, $a_0$, of 24.81 A. This pattern is characteristic of

EXAMPLE 7

*Preparation of zeolite N–Y*

A solution of tetramethylammonium aluminate was prepared by dissolving 4.76 g. of freshly precipitated Al(OH)$_3$ in a solution containing 27.0 g. of $$(CH_3)_4NOH \cdot 5H_2O$$

in 122 g. of water. The solution was then added to 20.0 g. of an aqueous colloidal silica sol containing 29.5 percent silica by weight. The resultant reaction mixture, having a composition, expressed in terms of moles of oxides, as follows:

$$2.5[(CH_3)_4N]_2O \cdot Al_2O_3 \cdot 3.4SiO_2 \cdot 3.14H_2O$$

was stirred until homogeneous. Crystallization of the desired zeolite product was carried out by heating the reaction mixture in a stainless steel reaction vessel at a temperature of 100° C. for about 13 days. The crystalline product which formed was separated from the reactant mother liquor by filtration, washed with water until the effluent wash water had a pH of about 9 to 11 and dried. X-ray analysis of the product revealed the powder diffraction pattern shown in Table E, with a unit cell constant, $a_0$, of 24.81 A. This pattern is characteristic of zeolite N–Y as shown in Table D. Chemical analysis showed the product zeolite to have a composition, expressed in terms of moles of oxides, corresponding to the formula:

$$0.6[(CH_3)_4N]_2O : 0.42Na_2O : Al_2O_3 : 3.46SiO_2 : 4.5H_2O$$

As discussed previously, the Na₂O in the product was derived from the colloidal silica sol used as a reactant.

TABLE E.—X-RAY POWDER DIFFRACTION DATA FOR TETRAMETHYLAMMONIUM ZEOLITE N-Y

| h k l | d, A. | I/I$_{max}$. ×100 |
|---|---|---|
| 111 | 14.28±.02 | 100 |
| 220 | 8.77±.02 | 18 |
| 311 | 7.48±.02 | 17 |
| 331 | 5.69±.01 | 11 |
| 333, 511 | 4.78±.01 | 10 |
| 440 | 4.39±.01 | 7 |
| 531 | 4.20±.01 | 4 |
| 600, 442 | 4.135±.004 | 1 |
| 620 | 3.924±.004 | 7 |
| 533 | 3.786±.003 | 20 |
| 631 | 3.661±.003 | 9 |
| 711, 551 | 3.474±.003 | 1 |
| 642 | 3.316±.002 | 17 |
| 733 | 3.032±.002 | 6 |
| 822, 660 | 2.923±.002 | 8 |
| 751, 555 | 2.866±.002 | 17 |
| 840 | 2.775±.002 | 6 |
| 911, 753 | 2.721±.002 | 2 |
| 664 | 2.646±.002 | 7 |
| 844 | 2.533±.002 | 2 |
| 10, 0, 0; 860 | 2.478±.002 | 1 |
| 10, 2, 0; 862 | 2.430±.002 | 1 |
| 10, 2, 2; 666 | 2.388±.002 | 4 |
| 10, 4, 0; 864 | 2.304±.002 | 1 |
| 11, 1, 1; 775 | 2.238±.001 | 1 |
| 880 | 2.193±.001 | 2 |
| 11, 3, 1; 971; 955 | 2.167±.001 | 2 |
| 11, 3, 3; 973 | 2.101±.001 | 1 |
| 12, 0, 0; 884 | 2.064±.001 | 1 |
| 11, 5, 2; 10, 7, 1; 10, 5, 5 | 2.023±.001 | 1 |
| 10, 8, 2 | 1.915±.001 | 2 |
| 13, 1, 1; 11, 7, 1; 11, 5, 5; 992 | 1.897±.001 | 1 |
| 13, 3, 1; 11, 7, 3; 977 | 1.853±.001 | 1 |
| 13, 3, 3; 995 | 1.841±.001 | 1 |
| 888 | 1.791±.001 | 1 |
| 13, 5, 1; 11, 7, 5 | 1.777±.001 | 1 |
| 14, 2, 0; 10, 10, 0; 10, 8, 6 | 1.754±.001 | 2 |
| 13, 5, 4; 11, 8, 5 | 1.707±.001 | 2 |

Cubic, $a_0$=24.81 A.

EXAMPLE 8

*Preparation of zeolite N–B*

A solution of trimethylammonium aluminate was prepared by dissolving 10.0 g. of freshly precipitated Al(OH)₃ in a solution containing 14.8 g. of (CH₃)₃NHOH in 180 g. of water. The solution was then added to 63.8 g. of an aqueous colloidal silica sol containing 29.5 percent silica by weight. The resultant reaction mixture, having a composition, expressed in terms of moles of oxides, as follows:

$$1.5[(CH_3)_3NH]_2O \cdot Al_2O_3 \cdot 6.0SiO_2 \cdot 200H_2O$$

was stirred until homogeneous. Crystallization of the desired zeolite product was carried out by heating the reaction mixture in a stainless steel reaction vessel at a temperature of 300° C. for about 3 days. The crystalline product which formed was separated from the reactant mother liquor by filtration, washed with water until the effluent wash water had a pH of about 9 to 11 and dried. X-ray analysis of the product revealed a powder diffraction pattern characteristic of zeolite N–B as shown in Table F, with a cubic unit cell constant, $a_0$, of 10.02 A.

TABLE F.—X-RAY POWDER DIFFRACTION DATA FOR ZEOLITE N-B

| h k l | d, A. | Relative Intensity |
|---|---|---|
| 110 | 7.09±.02 | VS |
| 200 | 5.00±.01 | MS |
| 112 | 4.09±.01 | VS |
| 220 | 3.54±.01 | W |
| 221 | 3.34±.01 | VW |
| 310 | 3.17±.01 | VS |
| 321 | 2.677±.002 | S |
| 400 | 2.511±.002 | W |
| 204 | 2.238±.002 | VW |
|  | 2.136±.002 | W |
|  | 2.017±.001 | VW |
|  | 1.962±.001 | M |
|  | 1.829±.001 | VW |
|  | 1.772±.001 | MW |
|  | 1.717±.001 | M |
|  | 1.669±.001 | MW |
|  | 1.624±.001 | W |
|  | 1.479±.001 | MW |
|  | 1.390±.001 | W |
|  | 1.363±.001 | MW |
|  | 1.313±.001 | VW |
|  | 1.271±.001 | MW |

Cubic $a_0$=10.02 A.

EXAMPLE 9

*Preparation of zeolite N–B with dimethylammonium hydroxide*

A solution of dimethylammonium aluminate was prepared by dissolving 10.0 g. of freshly precipitated Al(OH)₃ in a solution containing 12.1 g. of (CH₃)₂NH₂OH in 180 g. of water. The solution was then added to 31.9 g. of an aqueous colloidal silica sol containing 29.5 percent silica by weight. The resultant reaction mixture, having a composition, expressed in terms of moles of oxides, as follows:

$$1.5[(CH_3)_2NH_2]_2O \cdot Al_2O_3 \cdot 3.0SiO_2 \cdot 200H_2O$$

was stirred until homogeneous. Crystallization of the desired zeolite product was carried out by heating the reaction mixture in a stainless steel reaction vessel at a temperature of 200° C. for about 6 days. The crystalline product which formed was separated from the reactant mother liquor by filtration, washed with water until the effluent wash water had a pH of about 9 to 11 and dried. X-ray analysis of the product revealed a powder diffraction pattern characteristic of zeolite N–B as shown in Table F with a cubic unit cell constant, $a_0$, of 10.02 A. Chemical analysis showed 3.97 wt.-percent N, 5.32 wt.-percent C, and 2.84 wt.-percent H, giving a mole ratio of methyl to nitrogen in the product of 1.56.

The zeolites of the instant invention are amenable to a wide variety of applications such as separation of one fluid species from a stream containing many species by adsorption either preferentially or on the basis of the molecular dimensions of a particular fluid species. For satisfactory use as an adsorbent, the zeolite of this invention should be activated by at least partial dehydration. Such activation may be performed, for example, by heating the zeolite to temperatures of approximately 90° C. under atmospheric or reduced pressure, or by maintaining the zeolite at room temperature under vacuum. Unlike common adsorbents such as charcoal and silica gel which show adsorption selectivities based primarily on the boiling point or critical temperature of the adsorbate, the activated zeolites of this invention exhibit a selectivity based on the size, shape, degree of unsaturation, polarity and polarizability of the adsorbate molecule.

It is to be noted that the rejection characteristics of these zeolites are as important as the adsorption characteristics. The interstitial channels of these zeolites are such that at their narrowest points molecules with critical dimensions exceeding the pore diameter of the zeolite structure will not readily enter into the channels. The term "critical dimension" as employed herein may be defined as the maximum dimension of the minimum projected cross-section of the adsorbate molecule. The term may also be defined as the diameter of the smallest cylinder which will accommodate a model of the adsorbate molecule using the best available values of bond distances, bond angles and van der Waals' radii. Thus, molecules having critical dimensions exceeding the pore diameter of a given zeolite will be rejected by that zeolite, while those having smaller critical dimensions will be adsorbed.

Another property of these zeolites which contributes to its usefulness is that of adsorbing relatively large quantities of adsorbate at either very low adsorbate pressures or concentrations. The novel materials of this invention may therefore be utilized as selective adsorbents in numerous gas or liquid separation processes wherein adsorbents generally are not employed. The use of these zeolites also permits more efficient and more economical operation of numerous other processes now employing other adsorbents. The zeolites may, for example, be used in the removal of adsorbable impurities from gas and liquid mixtures, or in the recovery of minor components of such mixtures.

Samples of tetramethylammonium zeolites N–A and N–Y which had been activated by dehydration at a temperature of approximately 90° C. under vacuum, were tested to determine their adsorption properties. The results obtained are set forth in Table G. The adsorption properties of the zeolite samples were measured in a McBain-Bakr adsorption system. The samples were placed in light glass buckets suspended from quartz springs. They were activated in situ and the gas or vapor under test was then admitted to the system. The gain in weight of the adsorbent was measured by the spring extensions as read by a cathometer. In Table G, the pressure given for each adsorption is the pressure of the adsorbate. The term "weight percent adsorbed" refers to the percentage increase in the weight of the activated adsorbent.

It is seen from the data of Table G, for example, that molecules such as $O_2$ having a critical dimension less than about three Angstroms (A.) are substantially rejected by zeolite N–A, while molecules such as water and carbon dioxide of a more polar nature also having critical dimensions less than about three A. are adsorbed extensively. Zeolite N–Y, for example, has a pore size substantially greater than that of zeolite N–A.

TABLE G.—ZEOLITE N–A

| Adsorbate | Temp., °C. | Pmm. Hg | Weight Percent Adsorbed |
|---|---|---|---|
| $H_2O$ | 25 | 2 | 14.0 |
| $H_2O$ | 25 | 4 | 14.8 |
| $H_2O$ | 25 | 10 | 16.3 |
| $H_2O$ | 25 | 18 | 17.9 |
| $H_2O$ | 25 | 20 | 18.9 |
| $CO_2$ | 25 | 100 | 8.8 |
| $CO_2$ | 25 | 250 | 10.4 |
| $CO_2$ | 25 | 700 | 12.2 |
| $O_2$ | −183 | 100 | 1.5 |
| $O_2$ | −183 | 700 | 2.8 |

ZEOLITE N–Y

| | | | |
|---|---|---|---|
| $H_2O$ | 25 | 20 | 18.7 |
| $N_2$ | −196 | 25 | 13.0 |
| $N_2$ | −196 | 100 | 14.2 |
| $N_2$ | −196 | 500 | 15.3 |
| $N_2$ | −196 | 700 | 15.6 |

Again, zeolite N–A of this invention is further distinguished from the as-synthesized zeolite $Na_2A$ on the basis of adsorption characteristics, since the adsorption pore size of zeolite N–A is about 3 A. and the pore size of $Na_2A$ is about 4 A. Hence, the pore size difference allows separations of mixtures of molecules based on the size of the molecules to be carried out using zeolite N–A that cannot be accomplished by zeolite $Na_2A$. For example, molecules having critical dimensions of about 3.9 A. such as methane may be separated from a mixture of methane and molecules having critical dimensions of less than about 3 A., such as $CO_2$ and water. The nitrogenous zeolites described herein may also be used as desiccants after activation. For example, a wet stream of gaseous or liquid hydrocarbons may be efficiently dried by contacting this stream with activated nitrogenous zeolites of the present invention.

What is claimed is:

1. A synthetic, crystalline zeolite having a composition expressed in terms of moles of oxides as follows:

$$1.0\pm0.1[(CH_3)_4N]_2O:Al_2O_3:4.25\pm1.75\ SiO_2:yH_2O$$

wherein $y$ is any value from 0 to about 7, said synthetic crystalline zeolite having an X-ray diffraction pattern essentially the same as that shown in Table A, and the tetramethylammonium cation content of said zeolite having been introduced thereinto as an incident of the formation of the crystal lattice thereof.

2. A synthetic, crystalline zeolite having a composition expressed in terms of moles of oxides as follows:

$$1.0\pm0.1[(1-x)[(CH_3)_4N]_2O+xM_2O]:Al_2O_3:4.25\pm1.75\ SiO_2:yH_2O$$

wherein M represents an alkali metal cation, $x$ represents the fraction of M in the zeolite crystal and having values from 0 to about 0.9, and $y$ is any value from 0 to about 7, and the tetramethylammonium cation content of said zeolite having been introduced thereinto as an incident of the formation of the crystal lattice thereof.

3. A synthetic, crystalline zeolite having a composition expressed in terms of moles of oxides as follows:

$$1.0\pm0.1[(1-x)[(CH_3)_4N]_2O+xNa_2O]:Al_2O_3:4.25\pm1.75\ SiO_2:yH_2O$$

wherein $x$ represents the fraction of sodium ion in the zeolite crystal and having values from 0 to about 0.9 and $y$ is any value from 0 to about 7, said synthetic crystalline zeolite having an X-ray diffraction pattern essentially the same as that shown in Table A, and the tetramethylammonium cation content of said zeolite having been introduced therinto as an incident of the formation of the crystal lattice thereof.

4. A synthetic, crystalline zeolite having a composition expressed in terms of moles of oxides as follows:

$$1.0\pm0.1[(1-x)[(CH_3)_4N]_2O+xNa_2O]:Al_2O_3:4.25\pm1.75\ SiO_2:yH_2O$$

wherein $x$ represents the fraction of sodium ion in the zeolite crystal and having values from 0 to about 0.5 and $y$ is any value from 0 to about 7, said synthetic crystalline zeolite having an X-ray diffraction pattern esestnially the same as that shown in Table A, and the tetramethylammonium cation content of said zeolite having been introduced thereinto as an incident of the formation of the crystal lattice thereof.

5. A method for synthesizing tetramethylammonium zeolite N–A which comprises preparing at least two separate aqueous mixtures of reactants which in the aggregate when mixed contain water, silicate ions, aluminate ions and tetramethylammonium ions in the proportions such that the oxide mole ratios of the reactants in the aggregate falls within the ranges:

$$\frac{[(CH_3)_4N]_2O}{Al_2O_3}=1.5\ \text{to}\ 3.5$$

$SiO_2/Al_2O_3$ = greater than 4 to 10

$H_2O/Al_2O_3$ = 170–460 intimately mixing said separate aqueous mixtures to form an aggregate mixture; heating said aggregate mixture to between about 50° C. to 150° C. under autogeneous pressure until crystals of tetramethylammonium zeolite N–A form; and separating said crystals from the mother liquor.

6. A method for synthesizing tetramethylammonium zeolite N–A which comprises preparing at least two separate aqueous mixtures of reactants which in the aggregate when mixed contain water, silicate ions, aluminate ions and tetramethylammonium ions in the proportions such that the oxide mole ratios of the reactants in the aggregate mixture falls within the ranges:

$$[(CH_3)_4N]_2O/Al_2O_3 = 3.0 \text{ to } 3.5$$
$$SiO_2/Al_2O_3 = \text{about } 10$$
$$H_2O/Al_2O_3 = \text{about } 200$$

intimately mixing said separate aqueous mixture to form an aggregate mixture; heating said aggregate mixture to between about 50° C. to 150° C. under autogeneous pressure until crystals of tetramethylammonium zeolite N–A form; and separating said crystals from the mother liquor.

7. A method for synthesizing tetramethylammonium zeolite N–X which comprises preparing at least two separate aqueous mixtures of reactants which in the aggregate when mixed contain water, silicate ions, aluminate ions and tetramethylammonium ions in the proportions such that the oxide mole ratios of the reactants in the aggregate mixture falls within the ranges:

$$[(CH_3)_4N]_2O/Al_2O_3 = 1.5 \text{ to } 4.2$$
$$SiO_2/Al_2O_3 = 2 \text{ to } 3$$
$$H_2O/Al_2O_3 = 120 \text{ to } 300$$

intimately mixing said separate aqueous solutions to form an aggregate mixture; heating said aggregate mixture to between about 50° C. to 150° C. under autogenous conditions until crystals of tetramethylammonium zeolite N–X form; and separating said crystals from the mother liquor.

8. A method for synthesizing tetramethylammonium zeolite N–X which comprises preparing at least two separate aqueous mixtures of reactants which in the aggregate when mixed contain water, silicate ions, aluminate ions and tetramethylammonium ions in the proportions such that the oxide mole ratios of the reactants in the aggregate mixture falls within the ranges:

$$[(CH_3)_4N]_2O/Al_2O_3 = \text{about } 4$$
$$SiO_2/Al_2O_3 = \text{about } 3$$
$$H_2O/Al_2O_3 = \text{about } 200$$

intimately mixing said separate aqueous solutions to form an aggregate mixture; heating said aggregate mixture to between about 50° C. to 150° C. under autogenous conditions until crystals of tetramethylammonium zeolite N–X form; and separating said crystals from the mother liquor.

9. A method for synthesizing tetramethylammonium zeolite N–Y which comprises preparing at least two separate aqueous mixtures of reactants which in the aggregate when mixed contain water, silicate ions, aluminate ions and tetramethylammonium ions in the proportions such that the oxide mole ratios of the reactants in the aggregate mixture falls within the ranges:

$$[(CH_3)_4N]_2O/Al_2O_3 = 1.5 \text{ to } 2.5$$
$$SiO_2/Al_2O_3 = \text{greater than 3 to less than 4}$$
$$H_2O/Al_2O_3 = 120 \text{ to } 330$$

intimately mixing said separate aqueous mixtures to form an aggregate mixture; heating said aggregate mixture to between about 50° C. to 150° C. under autogeneous pressure until crystals of tetramethylammonium zeolite N–Y form; and separating said crystals from the mother liquor.

10. A method for synthesizing tetramethylammonium zeolite N–Y which comprises preparing at least two separate aqueous mixtures of reactants which in the aggregate when mixed contain water, silicate ions, aluminate ions and tetramethylammonium ions in the proportions such that the oxide mole ratios of the reactants in the aggregate mixture falls within the ranges:

$$[(CH_3)_4N]_2O/Al_2O_3 = \text{about } 2.5$$
$$SiO_2/Al_2O_3 = \text{about } 3.5$$
$$H_2O/Al_2O_3 = \text{about } 300$$

intimately mixing said separate aqueous mixtures to form an aggregate mixture; heating said aggregate mixture to between about 50° C. to 150° C. under autogeneous pressure until crystals of tetramethylammonium zeolite N–Y form; and separating said crystals from the mother liquor.

11. A method for synthesizing trimethylammonium zeolite N–B which comprises preparing at least two separate aqueous mixtures of reactants which in the aggregate when mixed contain water, silicate ions, aluminate ions and trimethylammonium ions in the proportions such that the oxide mole ratios of the reactants in the aggregate mixture falls within the ranges:

$$[(CH_3)_3HN]_2O/Al_2O_3 = \text{about } 1.5$$
$$SiO_2/Al_2O_3 = \text{about } 6$$
$$H_2O/Al_2O_3 = \text{about } 120\text{–}460$$

intimately mixing said separate aqueous mixtures to form an aggregate mixture; heating said aggregate mixture to between about 200° C. to 300° C. under autogeneous pressure until crystals of trimethylammonium zeolite N–B form; and separating said crystals from the mother liquor.

12. A method for synthesizing dimethylammonium zeolite N–B which comprises preparing at least two separate aqueous mixtures of reactants which in the aggregate when mixed contain water, silicate ions, aluminate ions and dimethylammonium ions in the proportions such that the oxide mole ratios of the reactants in the aggregate mixture falls within the ranges:

$$[H_2(CH_3)_2N]_2O/Al_2O_3 = \text{about } 1.5$$
$$SiO_2/Al_2O_3 = 2 \text{ to } 6$$
$$H_2O/Al_2O_3 = 120 \text{ to } 460$$

intimately mixing said separate aqueous mixtures to form an aggregate mixture; heating said aggregate mixture to between about 200° C. to 300° C. under autogeneous pressure until crystals of dimethylammonium zeolite N–B form; and separating said crystals from the mother liquor.

13. A method for synthesizing crystalline tetramethylammonium zeolite N–A which comprises preparing at least two separate aqueous mixtures of reactants which in the aggregate when mixed contain water, silicate ions, aluminate ions, alkali metal ions and tetramethylammonium ions in the proportions to form crystals of said N–A zeolite, said alkali metal ions being present in sufficient quantity to yield said N–A zeolite prepared from said aggregate mixture having a final mixed cationic composition in accordance with the following composition expressed in terms of moles of oxides:

$$1.0 \pm 0.1[(1-x)[(CH_3)_4N]_2O + xM_2O]:Al_2O_3:4.25 \pm 1.75\ SiO_2:yH_2O$$

wherein M represents the alkali metal cation, x represents the fraction of M in the zeolite crystal and positive values from 0 to about 0.9, and y is any value from 0 to about 7; intimately mixing said separate aqueous mixtures to form an aggregate mixture; heating said intimately mixed aqueous mixture to between about 50° C. to 150° C. under autogeneous pressure until crystals of said molecular sieve form; and separating said crystal from the mother liquor.

14. A method for synthesizing crystalline tetramethylammonium zeolite N–A which comprises preparing at least two separate aqueous mixtures of reactants which in the aggregate when mixed contain water, silicate ions, aluminate ions, sodium ions and tetramethylammonium ions in the proportions to form crystals of said N–A zeolite, said sodium ions being present in sufficient quantity to yield said N–A zeolite prepared from said aggregate mixture having a final mixed cationic composition in accordance with the following composition expressed in terms of moles of oxides:

$$1.0 \pm 0.1[1-x)[(CH_3)_4N]_2O + xNa_2O]:Al_2O_3:4.25 \pm 1.75 SiO_2:yH_2O$$

wherein x represents the fraction of sodium ion in the zeolite crystal and having positive values from 0 to about 0.9; and y is any value from 0 to about 7; intimately mixing said separate aqueous mixtures to form an aggregate mixture; heating said intimately mixed aqueous mixture to between about 50° C. to 150° C. under autogeneous pressure until crystals of said molecular sieve form; and separating said crystals from the mother liquor.

15. A method for synthesizing crystalline tetramethylammonium zeolite N–A which comprises preparing at least two separate aqueous mixtures of reactants which in the aggregate when mixed contain water, silicate ions, aluminate ions, sodium ions and tetramethylammonium ions in the proportions to form crystals of said N–A zeolite, said sodium ions being present in sufficient quantity to yield said N–A zeolite prepared from said aggregate mixture having a final mixed cationic composition in accordance with the following composition expressed in terms of moles of oxides:

$1.0\pm0.1[(1-x)[(CH_3)_4N]_2O+xNa_2O]$:
$Al_2O_3:4.25\pm1.75SiO_2:yH_2O$ wherein $x$ represents the fraction of sodium ion in the zeolite crystal and having positive values from 0 to about 0.5, and $y$ is any value from 0 to about 7; intimately mixing said separate aqueous mixtures to form an aggregate mixture; heating said intimately mixed aqueous mixture to between about 50° C. to 150° C. under autogeneous pressure until crystals of said molecular sieve form; and separating said crystals from the mother liquor.

16. A method for synthesizing crystalline tetramethylammonium zeolite N–Y which comprises preparing at least two separate aqueous mixtures of reactants which in the aggregate when mixed contain water, silicate ions, aluminate ions, sodium ions and tetramethylammonium ions in the proportions to form crystals of said N–Y zeolite, said sodium ions being present in sufficient quantity to yield said N–Y zeolite prepared from said aggregate mixture having a final mixed cationic composition in accordance with the following composition expressed in terms of moles of oxides:

$1.0\pm0.1[(1-x)[(CH_3)_4N]_2O+xNa_2O]$:
$Al_2O_3:(>3 \text{ to } 6)SiO_2:yH_2O$ wherein $x$ represents the fraction of sodium ion in the zeolite crystal and having positive values from 0 to about 0.99 and $y$ is any value from 0 to about 7; intimately mixing said separate aqueous mixtures to form an aggregate mixture; heating said intimately mixed aqueous mixture to between about 50° C. to 150° C. under autogeneous pressure until crystals of said molecular sieve form; and separating said crystals from the mother liquor.

17. A method for synthesizing crystalline tetramethylammonium zeolite N–X which comprises preparing at least two separate aqueous mixtures of reactants which in the aggregate when mixed contain water, silicate ions, aluminate ions, sodium ions and tetramethylammonium ions in the proportions to form crystals of said N–X zeolite, said sodium ions being present in sufficient quantity to yield said N–X zeolite prepared from said aggregate mixture having a final mixed cationic composition in accordance with the following composition expressed in terms of moles of oxides:

$1.0\pm0.1[1-x)[(CH_3)_4N]_2O+xNa_2O]$:
$Al_2O_3:2.5\pm0.5SiO_2:yH_2O$ wherein $x$ represents the fraction of sodium ion in the zeolite crystal and having positive values from 0 to about 0.99 and $y$ is any value from 0 to about 7; intimately mixing said separate aqueous mixtures to form an aggregate mixture; heating said intimately mixed aqueous mixture to between about 50° C. to 150° C. under autogeneous pressure until crystals of said molecular sieve form; and separating said crystals from the mother liquor.

18. A method for synthesizing crystalline trimethylammonium zeolite N–B which comprises preparing at least two separate aqueous mixtures of reactants which in the aggregate when mixed contain water, silicate ions, aluminate ions, sodium ions and trimethylammonium ions in the proportions to form crystals of said N–B zeolite, said sodium ions being present in sufficient quantity to yield said N–B zeolite prepared from said aggregate mixture having a final mixed cationic composition in accordance with the following composition expressed in terms of moles of oxides:

$1.0\pm0.2[(1-x)[(CH_3)_3HN]_2O+xNa_2O]$:
$Al_2O_3:3.5\pm1.5SiO_2:yH_2O$ wherein $x$ represents the fraction of sodium ion in the zeolite crystal and having positive values from 0 to about 0.8 and $y$ is any value from 0 to about 7; intimately mixing said separate aqueous mixtures to form an aggregate mixture; heating said intimately mixed aqueous mixture to between about 200° C. to 300° C. under autogeneous pressure until crystals of said molecular sieve form; and separating said crystals from the mother liquor.

19. A method for synthesizing crystalline dimethylammonium zeolite N–B which comprises preparing at least two separate aqueous mixtures of reactants which in the aggregate when mixed contain water, silicate ions, aluminate ions, sodium ions and dimethylammonium ions in the proportions to form crystals of said N–B zeolite, said sodium ions being present in sufficient quantity to yield said N–B zeolite prepared from said aggregate mixture having a final mixed cationic composition in accordance with the following composition expressed in terms of moles of oxides:

$1.0\pm0.2\{(1-x)[(CH_3)_2H_2N]_2O+xNa_2O\}$:
$Al_2O_3:3.5\pm1.5SiO_2:yH_2O$ wherein $x$ represents the fraction of sodium ion in the zeolite crystal and having positive values from 0 to about 0.8 and $y$ is any value from 0 to about 7; intimately mixing said separate aqueous mixtures to form an aggregate mixture; heating said intimately mixed aqueous mixture to between about 200° C. to 300° C. under autogenous pressure until crystals of said molecular sieve form; and separating said crystals from the mother liquor.

20. A synthetic, crystalline zeolite having a composition expressed in terms of moles of oxides as follows:

$0.1 \text{ to } 0.3[(CH_3)_4N]_2O:0.7 \text{ to } 1.0M_2O$:
$Al_2O_3:2.5 \text{ to } 4.0SiO_2:3.5 \text{ to } 5.5H_2O$ wherein M is a member selected from the group consisting of sodium and potassium and the sum of the number of moles of $[(CH_3)_4N]_2O$ and $M_2O$ is between 0.9 and 1.1, in which the $[(CH_3)_4N]_2O$ content of said zeolite has been introduced thereinto as an incident to the formation of the crystal lattice thereof.

References Cited by the Examiner

UNITED STATES PATENTS 2,882,243　4/1959　Milton _____ 23—113
2,950,952　8/1960　Breck et al. _____ 23—113

FOREIGN PATENTS 1,038,015　9/1958　Germany.

OTHER REFERENCES

Barrer et al.: Heivetica Chimica Acta, vol. XXXIX, Fasc. II (1956), No. 61.

Barrer et al.: Transactions of the Faraday Society, vol. 54, part 7, July 1958, pages 1074–1085.

TOBIAS E. LEVOW, *Primary Examiner.*

ABRAHAM H. WINKELSTEIN, *Examiner.*

I. R. PELLMAN, *Assistant Examiner.*